Oct. 23, 1928.  
J. C. JONES  
SEED SAVING ATTACHMENT FOR MOWING MACHINES  
Filed Dec. 23, 1924   3 Sheets-Sheet 1
1,688,969
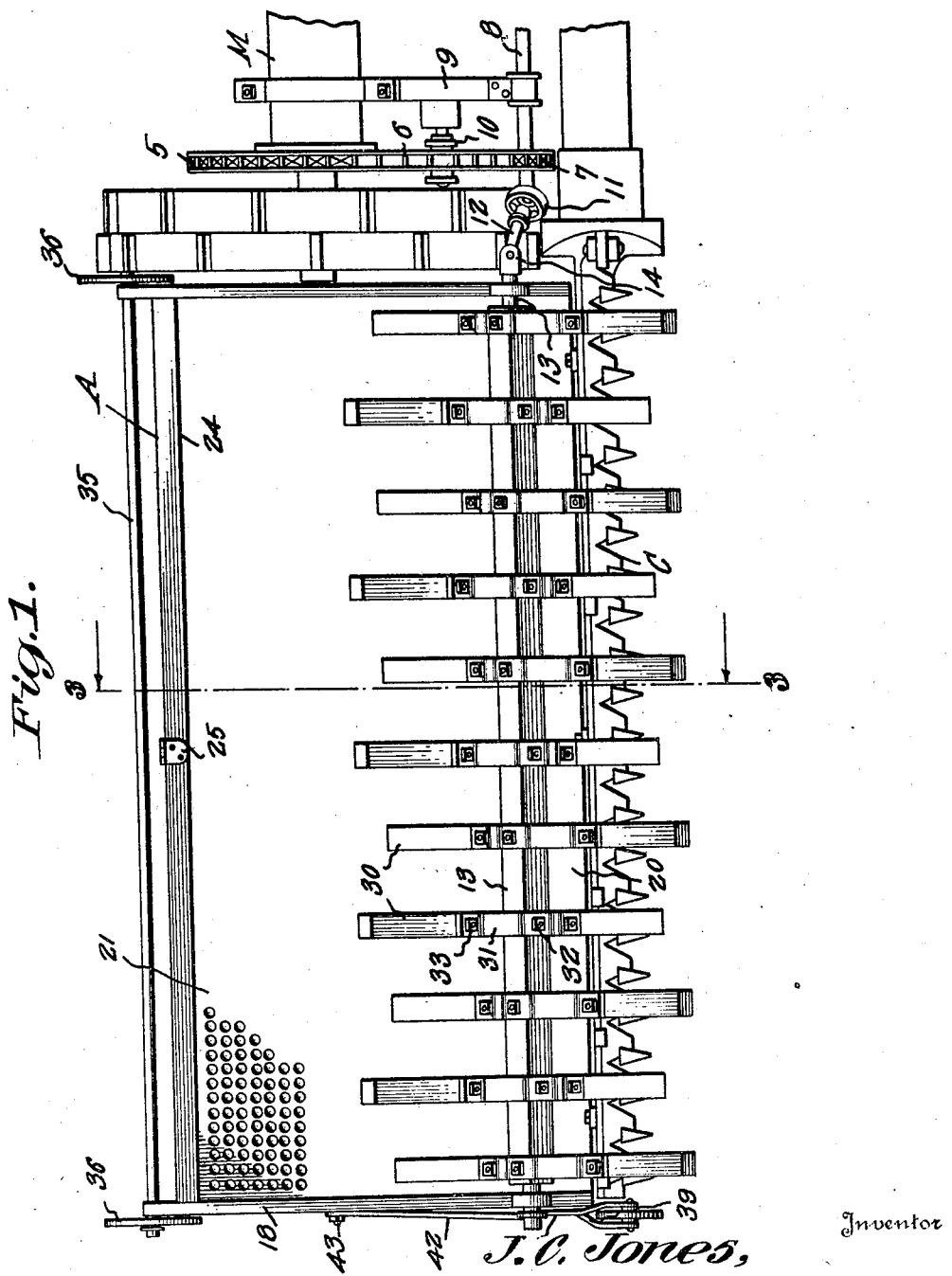

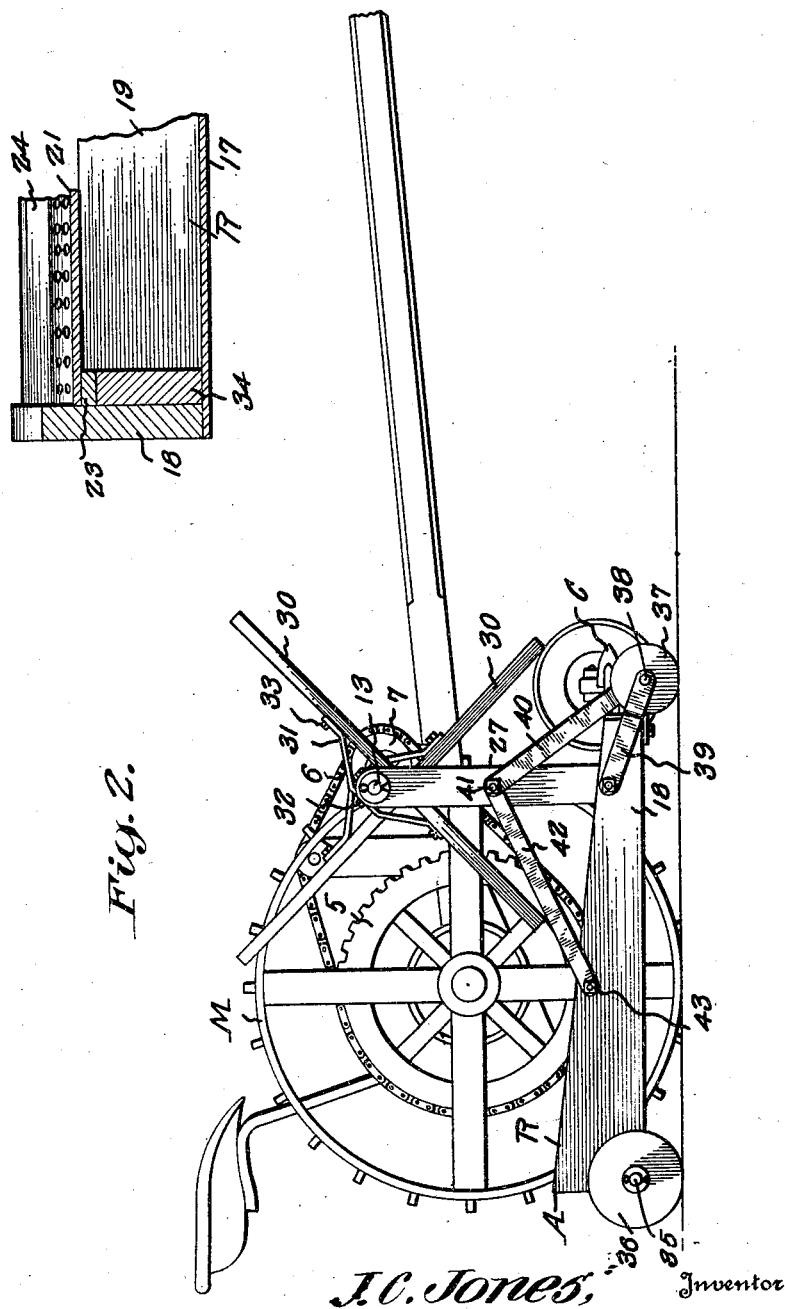

Oct. 23, 1928.　　　　　　　　　　　　　　　　　　　1,688,969
J. C. JONES
SEED SAVING ATTACHMENT FOR MOWING MACHINES
Filed Dec. 23, 1924　　　3 Sheets-Sheet 3
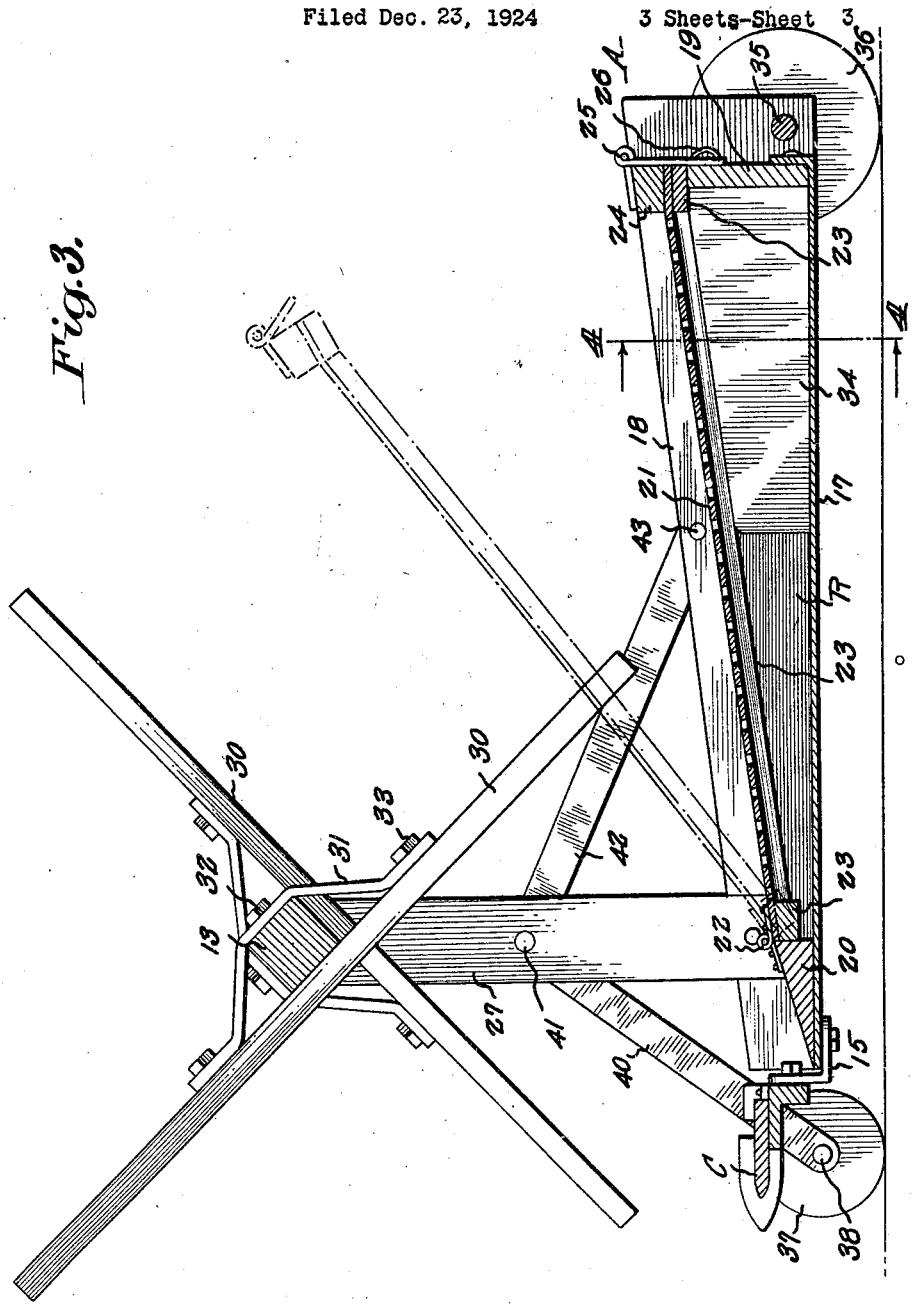
J. C. Jones, Inventor
Witnesses Patented Oct. 23, 1928.

1,688,969

UNITED STATES PATENT OFFICE.

JAMES C. JONES, OF BRIGHTON, TENNESSEE.

SEED-SAVING ATTACHMENT FOR MOWING MACHINES.

Application filed December 23, 1924. Serial No. 757,760.

The present invention relates to a seed collecting and saving device for attachment to a mowing machine and has for its principal object to provide a structure which is efficient and reliable in its operation for collecting the seeds from hay or the like being mowed without losing a considerable amount thereof.

Another important object of the invention is to provide an apparatus of this nature which is capable of being assembled in attachment with mowing machines of conventional type now in use.

A still further object of the invention is to provide an apparatus of this nature which is effective in its operation upon comparatively rough ground.

Another very important object of the invention is to provide an apparatus of this nature having an exceedingly simple structure which may be constructed at a relatively low cost and yet be efficient, strong, durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus showing the same associated with a portion of a conventional form of mower, Figure 2 is an end elevation thereof.

Figure 3 is a vertical central transverse section taken substantially on the line 3—3 of Figure 1 looking in the direction of the arrows, and Figure 4 is a detail vertical section taken substantially on the line 4—4 of Figure 3 looking in the direction of the arrows.

Referring to the drawing in detail it will be seen that a portion of a mowing machine has been disclosed generally at M and my attachment is indicated generally by the letter A situated alongside of the mowing machine. I will describe only those portions of the mowing machine which cooperate with my attachment. A drive sprocket 5 is provided on the mowing machine and a chain 6 is trained thereover and also over a driven sprocket 7 on a shaft 8. This shaft 8 is supported by suitable brackets 9 at the forward portion of the mowing machine. The bracket 9 also supports an idler 10 which is associated with the chain 6. At the end of the shaft 8 adjacent the attachment A there is provided a universal joint 11 connected to a relatively short shaft 12 which is coupled to shaft 13 through a universal joint 14. The shaft 13 is part of the attachment A and will be referred to more in detail later. The usual cutting mechanism C extends transversely of the mowing machine in front of the attachment A and is preferably engaged therewith by means of brackets 15.

Referring now particularly to the attachment A it will be seen that the same is provided with a receptacle R. This receptacle R consists of the bottom 17, side walls 18 and rear wall 19. The side walls 18 taper from the rear forwardly and a front wall 20 is disposed therebetween on the bottom 17 at the forward end and is substantially triangular in cross section as shown in Figure 3. In the present instance this front wall 20 is right triangular in cross section so that the longer leg side rests on the bottom and the shorter leg side is at the rear thereof extending upwardly at right angles to the bottom 17. A perforated cover 21 is hinged at 22 to the upper or hypotenuse face of the front wall 20. The perforated cover 21 on its under face along its edges is provided with reinforcing strips 23. The side walls 18 extend above the cover 21 when the latter is closed, it being noted that the reinforcing strip 23 at the free end of the cover rests on the rear wall 19. A stop strip 24 is mounted on the upper face of the cover 21 adjacent its free end and a hinged hasp 25 is attached thereto for association with a staple 26 on the rear wall 19 for holding the cover closed.

A pair of standards 27 rise from the receptacle being securely attached to the sides 18 thereof. The shaft 13 is journaled in the upper end of each standard. In the present embodiment of the invention the shaft 13 is provided with rounded ends extending through the standards 27 and therebeyond while the intermediate portion of the shaft is square in cross section. A plurality of flailing bars are arranged in pairs along the intermediate portion of the shaft 13 and the bars of each pair indicated at 30 cross each other intermediate their ends. These bars are held in place by straps 31 engaged with the shaft as at 32 intermediate their ends and at their ends to the bar as at 33. The shaft 13 is rotated so that the bars 30 will throw the cuttings from the cutting mechanism C on to the cover 21 so that the seeds may pass through the apertures provided therein and collect in the receptacle R. It is preferable to provide this receptacle with a partition 34 extending forwardly from the rear wall 19 and terminating a distance from the front wall 20. As will be readily seen this partition serves to support one side edge of the seed pan 21.

It will be noted that the side walls 18 extend to the rear of the rear wall 19 and an axle 35 is supported in the rear ends of these side walls 18, at the bottom thereof, by passing therethrough and wheels 36 are mounted on the ends of this axle 35 for movably supporting the rear portion of the attachment. The front of the attachment is partially supported on the cutting mechanism C by the brackets 15 and the end farther from the bore is additionally supported by wheel 37 which is mounted on an axle 38 carried by brackets 39 and 40. The bracket 39 is attached to the adjacent side wall 18 and the bracket 40 is engaged on a bolt 41 passing through an intermediate portion of the adjacent standard 27. Another brace bracket 42 is attached to this bolt 41 and extends rearwardly with its rear end attached to an intermediate portion of the adjacent wall 18 as at 43.

It is thought that the construction of the invention as well as its operation can be now readily appreciated without a more detail description thereof. With this attachment on the mower it will be seen that a much greater amount of seed may be saved than with the use of the ordinary means. It will also be apparent that the device includes a very simple construction which will be thoroughly efficient and reliable and not liable to get out of order. The attachment embodies all the features of advantage enumerated as desirable in the statement of the invention and above description and it is desired to point out that numerous changes in the details of construction and in the combination and arrangement of parts may be resorted to without departing from the spirit or scope of the invention as hereinafter claimed or sacrificing any of its advantages.

Having thus described my invention, what I claim as new is:

A seed saving attachment for mowing machines including a laterally extending cutting bar, comprising a receiver pan structure consisting of a bottom, side wall members extending upwardly therefrom, a supplemental wall of less height than and arranged against the inner face of a side wall, a rear wall of less height than said side walls and resting upon said bottom, a front wall of substantially triangular cross section resting upon and extending transversely of the said bottom adjacent the forward edge thereof, said front wall presenting a rearwardly and upwardly inclined top surface, a screen frame for said pan comprising front, rear and side bars, a screen body overlying said frame, a hinge member securing said front bar to the front wall of said pan and maintaining said bar and the screen substantially flush with the top of said front wall, said frame having one side bar resting on the supplemental wall and the rear bar resting upon the rear wall, and a flailing structure mounted to revolve over the forward portion of said pan to throw cuttings from said cutting bar onto said screen.

In testimony whereof I affix my signature.

JAMES C. JONES.